(12) United States Patent
Schwinke et al.

(10) Patent No.: US 7,072,645 B2
(45) Date of Patent: Jul. 4, 2006

(54) IN-VEHICLE AUTOMATED CALL ROUTING USING AN ORIGIN IDENTIFIER

(75) Inventors: Steven P. Schwinke, Plymouth, MI (US); William E. Italia, Howell, MI (US); James J. Piwowarski, Holly, MI (US); Kevin R. Krause, Plymouth, MI (US)

(73) Assignee: General Motors Corporation, Detroit, MI (US)

( * ) Notice: Subject to any disclaimer, the term of this patent is extended or adjusted under 35 U.S.C. 154(b) by 210 days.

(21) Appl. No.: 10/691,871

(22) Filed: Oct. 23, 2003

(65) Prior Publication Data

US 2005/0090236 A1   Apr. 28, 2005

(51) Int. Cl.
*H04M 3/42* (2006.01)
*H04M 1/00* (2006.01)
*H04Q 7/20* (2006.01)
(52) U.S. Cl. .................... 455/415; 455/445; 455/569.2
(58) Field of Classification Search ................ 455/415, 455/569.2, 445
See application file for complete search history.

(56) References Cited

U.S. PATENT DOCUMENTS

| | | | | |
|---|---|---|---|---|
| 5,559,860 A | * | 9/1996 | Mizikovsky | 455/413 |
| 5,903,628 A | * | 5/1999 | Brennan | 379/88.21 |
| 6,148,212 A | * | 11/2000 | Park et al. | 455/456.1 |
| 6,434,223 B1 | | 8/2002 | Katz | 379/93.13 |
| 6,687,587 B1 | * | 2/2004 | Kacel | 701/33 |

* cited by examiner

*Primary Examiner*—Jean Gelin
*Assistant Examiner*—Wesley Kim
(74) *Attorney, Agent, or Firm*—Cardinal Law Group

(57) ABSTRACT

The present invention provides a method for implementing automated call routing using an origin identifier within a telematics equipped mobile vehicle that includes receiving an incoming call signal, the incoming call signal including an origin identifier, determining an answer mode based on the origin identifier of the incoming call signal, initiating the answer mode responsive to the answer mode determination, and operating the telematics unit based on the initiated answer mode. Origin identifiers may include an automatic number identifier and a digital signature. The step of determining the answer mode may include determining a first answer mode when the origin identifier is within a predetermined group of origin identifiers and determining a second answer mode when the origin identifier is not within the predetermined group of origin identifiers.

15 Claims, 3 Drawing Sheets

IN-VEHICLE AUTOMATED CALL ROUTING USING AN ORIGIN IDENTIFIER

FIELD OF THE INVENTION

This invention relates generally to wireless communications with a mobile vehicle. More specifically, the invention relates to a method and system for implementing automated call routing using an origin identifier within a telematics equipped mobile vehicle.

BACKGROUND OF THE INVENTION

The opportunity to utilize wireless features in a mobile vehicle is ever increasing as the automobile is being transformed into a communications and entertainment platform as well as a transportation platform. Wireless features include wireless vehicle communication, networking, maintenance and diagnostic services for a mobile vehicle.

Typically, conventional wireless systems within mobile vehicles (e.g. telematics units) answer all incoming call signals. This occurs whether the vehicle is running or simply "awake" because of a programmed cycle. While this behavior has not been overly problematic in the recent past, it has in fact been necessary to ensure that data connectivity to the telematics unit is possible at all times. However, problems may occur in the implementation of new features, such as, for example Enhanced Call Forwarding.

Unfortunately, after a call has been answered by the telematics unit it can not be forwarded to voice-mail without employing a network-based solution, which has been shown to be costly and quite complex. It would be desirable, therefore, to provide a method and system that would overcome these and other disadvantages.

SUMMARY OF THE INVENTION

One aspect of the invention includes a method for operating a telematics unit within a mobile vehicle. The method includes receiving an incoming call signal including an origin identifier, determining an answer mode based on the origin identifier of the incoming call signal, initiating the answer mode responsive to the answer mode determination, and operating the telematics unit based on the initiated answer mode.

In accordance with another aspect of the invention, a computer readable medium storing a computer program includes: computer readable code for determining an answer mode based on an origin identifier included within an incoming call signal; computer readable code for initiating the answer mode responsive to the answer mode determination; and computer readable code for operating the telematics unit based on the initiated answer mode.

In accordance with yet another aspect of the invention, a system for operating a telematics unit within a mobile vehicle is provided. The system includes means for receiving an incoming call signal including an origin identifier. The system additionally includes means for determining an answer mode based on the origin identifier of the incoming call signal. Means for initiating the answer mode responsive to the answer mode determination is provided. Means for operating the telematics unit based on the initiated answer mode is also provided.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
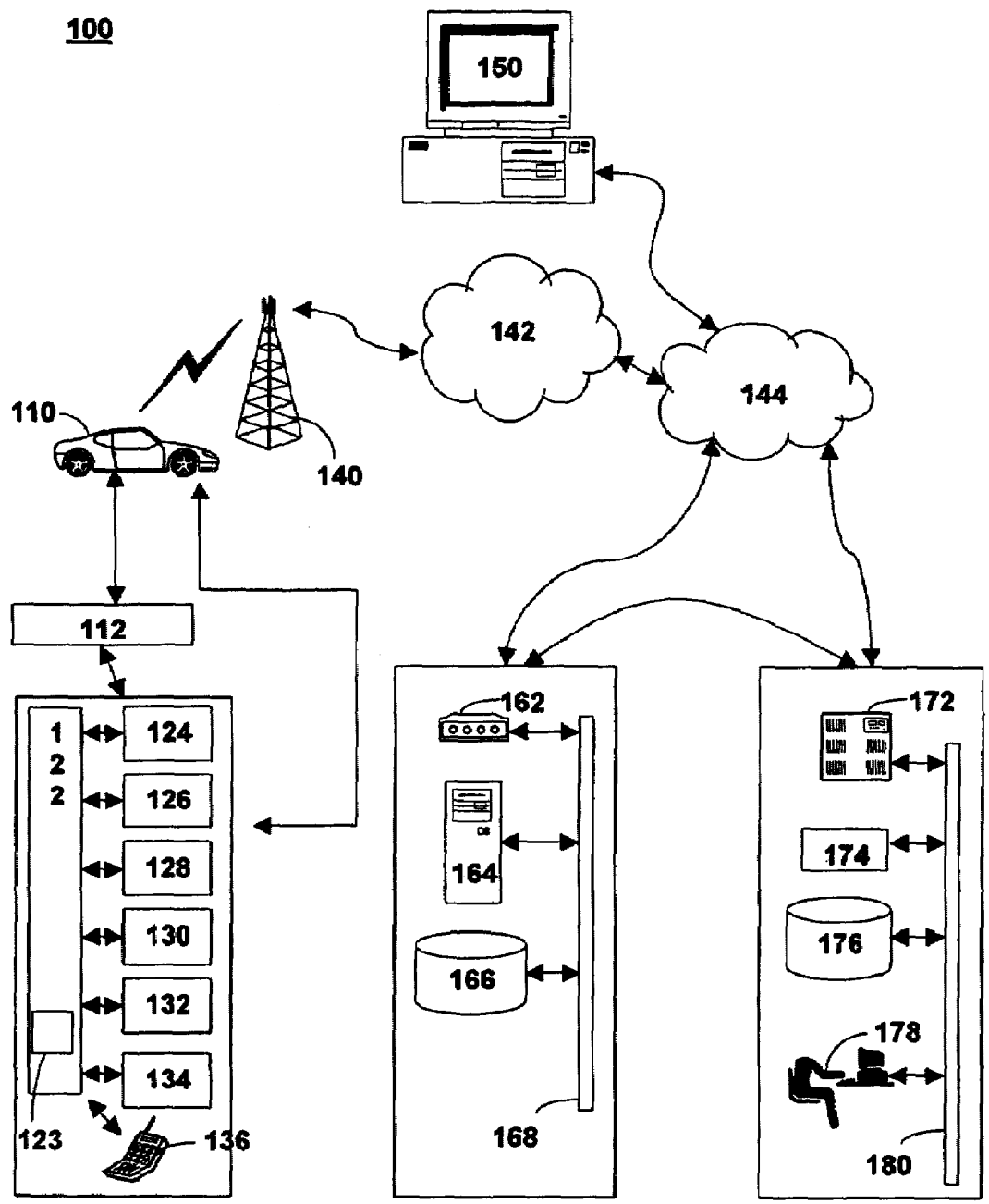
FIG. 1 illustrates one embodiment of a system for implementing automated call routing using an origin identifier within a telematics equipped mobile vehicle, in accordance with one aspect of the current invention.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication bus 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

MVCU 110, via a vehicle communication bus 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication bus 112 utilizes bus interfaces such as controller-area network (CAN), International Organization for Standardization (ISO) Standard 9141, J1850, ISO Standard 11898 for high-speed applications, ISO Standard 11519 for lower speed applications, and Society of Automotive Engineers (SAE) Standard J1850 for high speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network 168. Web server 164 includes computer applications and files for managing and storing personalization settings supplied by the client, such as door lock/unlock behavior, radio station present selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Telematics unit 120 includes a digital signal processor (DSP) 122 connected to a wireless modem 124, a global positioning system (GPS) unit 126, an in-vehicle memory 128, a microphone 130, one or more speakers 132, origin identifier module 134, and an embedded or in-vehicle mobile phone 136. In other embodiments, telematics unit 120 may be implemented without one or more of the above listed components, such as, for example GPS unit 126 and speakers 132. DSP 122 further includes vehicle information controller 123. Telematics unit 120 may include additional components not relevant to the present discussion.

In one embodiment, DSP 122 is implemented as a microcontroller, controller, host processor, or vehicle communications processor. In an example, DSP 122 is implemented as an application specific integrated circuit (ASIC). Vehicle information controller 123 is a software module that facilitates the reception and implementation of commands from a MVCS 100 controller, such as, for example call center 170. In an example, commands from call center 170 include vehicle-side system updates. In another example, commands from call center 170 include user preference updates. In another embodiment, vehicle information controller 123 is implemented as a hardware module (not shown), in communication with DSP 122, including software that facilitates the reception and implementation of commands from call center 170. GPS unit 126 provides longitude and latitude coordinates of the vehicle responsive to a GPS broadcast signal received from a one or more GPS satellite broadcast systems (not shown). In-vehicle mobile phone 136 is a cellular-type phone, such as, for example an analog, digital, dual-mode, dual-band, multi-mode or multi-band cellular phone.

DSP 122 executes various computer programs that control programming and operational modes of electronic and mechanical systems within MVCU 110. DSP 122 controls communications (e.g. call signals) between telematics unit 120, wireless carrier system 140, and call center 170. In one embodiment, a voice-recognition application is installed in DSP 122 that can translate human voice input through microphone 130 to digital signals. DSP 122 generates and accepts digital signals transmitted between telematics unit 120 and a vehicle communication bus 112 that is connected to various electronic modules in the vehicle. In one embodiment, these digital signals activate the programming mode and operation modes, as well as provide for data transfers. In this embodiment, signals from DSP 122 are translated into voice messages and sent out through speaker 132.

Origin identifier module 134 includes hardware and software to detect and identify origin identifiers included within communications between telematics unit 120, wireless carrier system 140, and call center 170. Examples of origin identifiers include automatic number identifiers and digital signatures. Digital signature is a form of cryptography that appends extra data to a message that identifies and authenticates the sender and message data using public or private encryption key methods. Encryption key methods are well known to practitioners in the art. In one embodiment, origin identifier module 134 is implemented as an independent hardware component and associated software that is interfaced with DSP 122. In another embodiment, origin identifier module 134 is implemented as a hardware component and associated software that is embedded within DSP 122.

The origin identifier included within the communication is sent to DSP 122 for processing. DSP 122 determines and initiates one of several answer modes responsive to the received origin identifier. Each answer mode is associated with predetermined group of origin identifiers. In one embodiment, the answer modes are associated with a predetermined group of origin identifiers provided by a MVCS 100 controller, such as, for example call center 170. The predetermined group of origin identifiers is stored within DSP 122, such as, for example in a look-up table within DSP 122 or within a component of DSP 122. In another embodiment, one or more of the answer modes is associated with one or more predetermined groups of origin identifiers provided within user-preference data. In an example, one or more of the answer modes is associated with one or more predetermined groups of origin identifiers provided by a client via computer 150 and call center 170 and stored within DSP 122.

In operation, each answer mode provides operating parameters for directing an incoming call signal. In one embodiment, two answer modes are provided by a mobile vehicle communication system controller. The first answer mode is associated with a predetermined group of origin identifiers that are compared to the origin identifier within the incoming call signal. If the origin identifier within the incoming call signal matches any of the predetermined group of origin identifiers, the first answer mode is initiated. In this embodiment, when the first answer mode is initiated the incoming call signal is directed and connected to vehicle information controller 123 located within telematics unit 120, such as, for example within DSP 122. Connecting the incoming call to vehicle information controller 123 allows reception and implementation of commands from call center 170, such as, for example vehicle updates.

In this embodiment, the second answer mode is associated with all remaining origin identifiers. If the origin identifier within the incoming call signal does not match any of the predetermined group of origin identifiers, the second answer mode is initiated. In this embodiment, when the second answer mode is initiated, the incoming call signal is directed to a user interface. In an example, if the origin identifier in the incoming call signal does not match any of the predetermined group of origin identifiers, the incoming call signal is directed to a user interface within the mobile vehicle, such as, in-vehicle mobile phone 136. In this embodiment, the incoming call signal is connected to the user interface if a user activates the user interface. Alternatively, if the user interface is not activated, the incoming call signal is directed to an electronic voice-mail system. In an example, if the user interface is not activated, the incoming call signal is directed to an electronic voice-mail system by an associated phone service provider.

In other embodiments, additional origin identifiers are provided as well as associated answer modes, such as, for example by the client. In these embodiments, each answer mode provides additional operating parameters for directing the incoming call signal(s). In an example, a client provides additional answer modes and associated origin identifiers to telematics unit 120 via computer 150 and call center 170. In this example, a client provides one or more origin identifiers and associates one or more answer modes to the origin identifiers, such as, providing a list of origin identifiers that the client desires to be sent directly to the electronic voice-mail system by an associated phone service provider. The additional answer modes provide greater flexibility to the client as well as the system provider.

Figure 2:
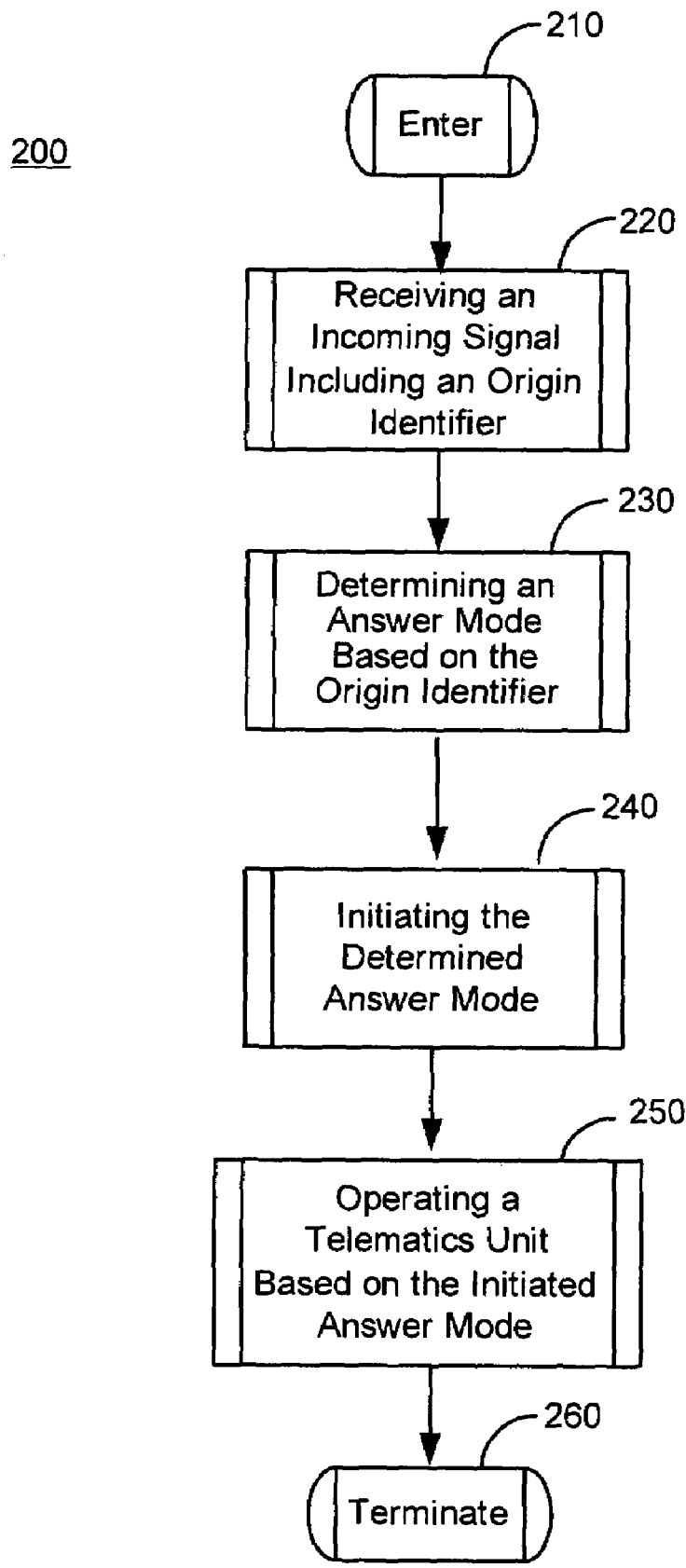
FIG. 2 is a flow diagram of one embodiment of a method of implementing automated call routing using an origin identifier within a telematics equipped mobile vehicle, in accordance with one aspect of the current invention.

FIG. 2 is a flow diagram of an embodiment of a method of implementing automated call routing using an origin identifier within a telematics equipped mobile vehicle. In FIG. 2, method 200 may utilize one or more systems detailed in FIG. 1 above. The present invention can also take the form of a computer usable medium including a program for configuring an electronic module within a vehicle. The program stored in the computer usable medium includes computer program code for executing the method steps described in FIG. 2. In FIG. 2, method 200 begins at step 210.

At step 220, an incoming call signal, including an origin identifier, is received at a telematics unit within a mobile vehicle. Examples of origin identifiers include an automatic number identifier, a digital signature. In an example and referring to FIG. 1 above, an incoming call signal, including an origin identifier, in mobile vehicle communication system (MVCS) 100 is received at DSP 122 within mobile vehicle communication unit (MVCU) 110.

At step 230, an answer mode is determined based on the origin identifier of the incoming call signal. In one embodiment, determining the answer mode includes determining a first answer mode when the origin identifier is within a predetermined group of origin identifiers and determining a second answer mode when the origin identifier is not within the predetermined group of origin identifiers. In an example and referring to FIG. 1 above, the incoming call signal is routed to origin identifier module 134 that detects and identifies an origin identifier included within the incoming signal. The detected origin identifier is then sent to DSP 122 for processing. DSP 122 processes the origin identifier and determines if the origin identifier is included within a predetermined group of origin identifiers associated with the first answer mode. If the origin identifier is not included within a predetermined group of origin identifiers associated with the first answer mode, then DSP 122 determines the second answer mode is the answer mode.

In other embodiments, additional answer modes are provided as well as associated predetermined groups of origin identifiers. In these embodiments, each answer mode provides additional operating parameters for directing the incoming call signal(s) as described in FIG. 1, above.

At step 240, the determined answer mode is initiated. In one embodiment, the first answer mode is initiated when DSP 122 determines that the origin identifier is within a predetermined group of origin identifiers. In this embodiment, the second answer mode is initiated when DSP 122 determines that the origin identifier is not within a predetermined group of origin identifiers.

At step 250, the telematics unit operates based on the initiated answer mode. In one embodiment, operating the telematics unit based on the first answer mode includes directing the incoming call signal to a vehicle information controller within the telematics unit. In this embodiment, operating the telematics unit based on the first answer mode additionally includes connecting the incoming call signal to the vehicle information controller within the telematics unit. In an example and referring to FIG. 1 above, operating telematics unit 120 based on the first answer mode includes directing and connecting the incoming call signal to a vehicle information controller 123 within telematics unit 120.

In another embodiment, operating the telematics unit based on the second answer mode includes directing the incoming call signal to a user interface within the telematics unit. In this embodiment, operating the telematics unit based on the second answer mode additionally includes connecting the incoming call signal to the user interface within the telematics unit responsive to a user interface activation. In an example and referring to FIG. 1 above, operating telematics unit 120 based on the second answer mode includes directing and connecting the incoming call signal to a user interface, such as, in-vehicle mobile phone 136 within telematics unit 120 responsive to a user interface activation.

In yet another embodiment, operating the telematics unit based on the second answer mode includes directing the incoming call signal to a user interface within the telematics unit. In this embodiment, operating the telematics unit based on the second answer mode additionally includes determining the user interface is not activated and activating an electronic voice-mail system. In an example, operating the telematics unit based on the second answer mode includes determining the user interface, such as, in-vehicle mobile phone 136 is not activated and activating an electronic voicemail system as described in FIG. 1, above.

At step 260, the method ends.

Figure 3:
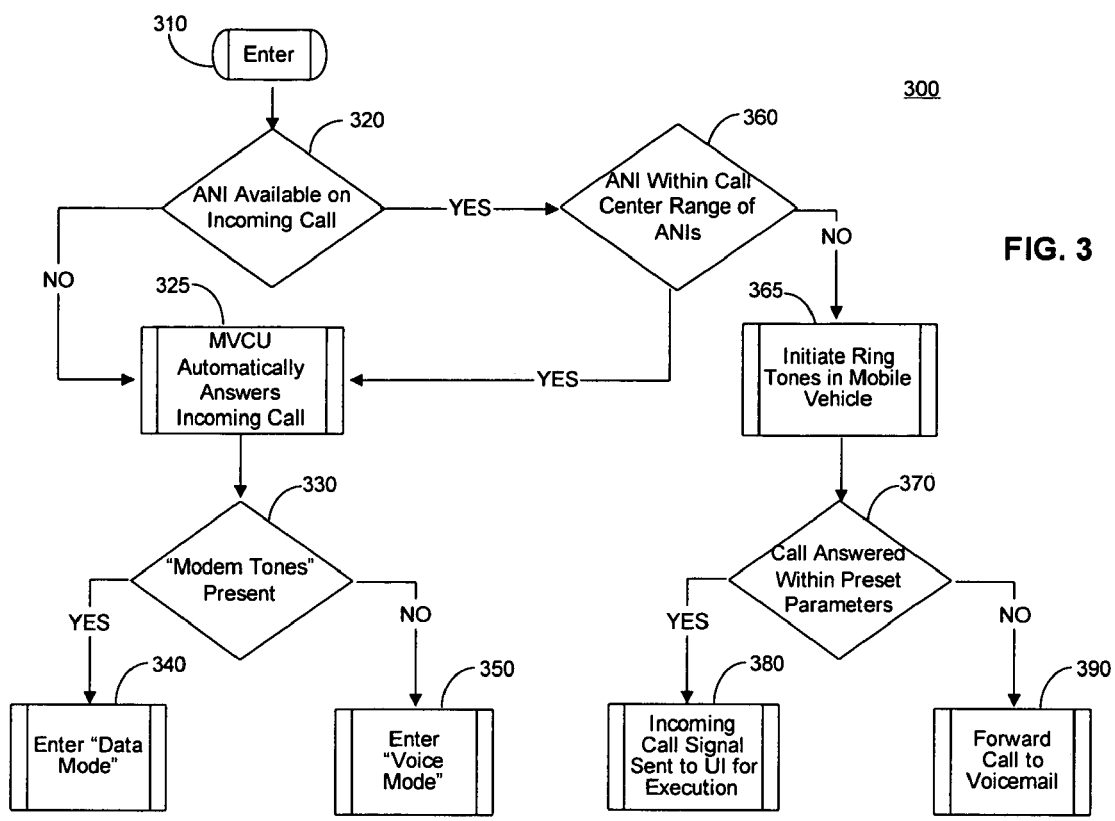
FIG. 3 is a flow diagram of another embodiment of a method of implementing automated call routing using an origin identifier within a telematics equipped mobile vehicle, in accordance with one aspect of the current invention.

FIG. 3 is a flow diagram of another embodiment of a method of implementing automated call routing using an origin identifier within a telematics equipped mobile vehicle. In FIG. 3, method 300 may utilize one or more systems detailed in FIG. 1 above. The present invention can also take the form of a computer usable medium including a program for configuring an electronic module within a vehicle. The program stored in the computer usable medium includes computer program code for executing the method steps described in FIG. 3. In FIG. 3, method 300 begins at step 310.

At decision step 320, a determination is made as to if an origin identifier, such as, for example an automatic number identifier (ANI) is included within an incoming call signal. If there is an origin identifier within the incoming call signal, method 300 advances to step 360. If there is not an origin identifier within the incoming call signal, method 300 advances to step 325.

At decision step 360, a determination is made as to if the origin identifier is within a call center identified range of origin identifiers. If the origin identifier is within the call center identified range of origin identifiers, method 300 advances to step 325. If the origin identifier is not within the call center identified range of origin identifiers, method 300 advances to step 365.

At step 325, the mobile vehicle communication unit (MVCU) automatically answers the incoming call signal. At decision step 330, a determination is made as to if a modem is present or functioning, such as, for example if "modem tones" are present. If the modem is present and functioning, method 300 advances to step 340. If the modem is not present or is not functioning, or is present and functioning but not producing "modem tones," method 300 advances to step 350.

At step 340, the telematics unit within the MVCU enters a data mode, such as, for example to receive data from the call center. At step 350, the telematics unit within the MVCU enters a voice mode such as, for example to receive a voice transmission from the call center.

At step 365, the telematics unit directs and connects the incoming call signal to a vehicle information controller that initiates ring tones within the mobile vehicle. At decision step 370, a determination is made as to if the incoming call signal is answered within a preset amount of time, such as, for example within a determined amount of rings. If the incoming call signal is answered within a preset amount of time, method 300 advances to step 380. If the incoming call signal is not answered within a preset amount of time, method 300 advances to step 390.

At step 380, the incoming call signal is connected to a user interface for execution. At step 380, the incoming call signal is forwarded to an electronic voicemail system. In another embodiment, the incoming call signal is routed to an electronic voicemail system by the call signal provider for voicemail execution.

The above-described methods and implementation for implementing automated call routing using an origin identifier within a telematics equipped mobile vehicle are example methods and implementations. These methods and implementations illustrate one possible approach for implementing automated call routing using an origin identifier within a telematics equipped mobile vehicle. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method for operating a telematics unit within a mobile vehicle, the method comprising:
   receiving an incoming call signal, the incoming call signal including an origin identifier;
   determining an answer mode based on the origin identifier of the incoming call signal;
   determining a first answer mode when the origin identifier is within a predetermined group of origin identifiers, and determining a second answer mode when the origin identifier is not within the predetermined group of origin identifiers wherein the predetermined group of origin identifiers is a call center identified group of origin identifiers, and wherein the incoming call signal is routed to a vehicle communication unit if the origin identifier is within the call center identified group of origin identifiers and wherein the incoming call signal is routed to a user interface if the origin identifier is not within the call center identified group of origin identifiers;
   initiating the answer mode responsive to the answer mode determination; and
   operating the telematics unit based on the initiated answer mode.

2. The method of claim 1, wherein the origin identifier is selected from the group consisting of: an automatic number identifier, and a digital signature.

3. The method of claim 1, wherein operating the telematics unit based on the first answer mode comprises:
   directing the incoming call signal to a vehicle information controller within the telematics unit.

4. The method of claim 3, further comprising:
   connecting the incoming call signal to the vehicle information controller within the telematics unit.

5. The method of claim 1, wherein operating the telematics unit based on the second answer mode comprises:
   directing the incoming call signal to a user interface within the telematics unit.

6. The method of claim 5, further comprising:
   connecting the incoming call signal to the user interface within the telematics unit responsive to a user interface activation.

7. The method of claim 5, further comprising:
   determining the user interface is not activated; and
   activating an electronic voice-mail system.

8. A computer readable medium for operating a telematics unit within a mobile vehicle, comprising:
   computer readable code for determining an answer mode based on an origin identifier included within an incoming call signal;
   computer readable code for determining a first answer mode when the origin identifier is within a predetermined group of origin identifiers, and determining a second answer mode when the origin identifier is not within the predetermined group of origin identifiers wherein the group of origin identifiers is a call center identified group of origin identifiers, and wherein the incoming call signal is routed to a vehicle communication unit if the origin identifier is within the call center identified group of origin identifiers and wherein the incoming call signal is routed to a user interface if the origin identifier is not within the call center identified group of origin identifiers;
   computer readable code for initiating the answer mode responsive to the answer mode determination; and
   computer readable code for operating the telematics unit based on the initiated answer mode.

9. The computer readable medium of claim 8, wherein the origin identifier is selected from the group consisting of: an automatic number identifier, and a digital signature.

10. The computer readable medium of claim 8, wherein the computer readable code for operating the telematics unit based on the first answer mode comprises:
   computer readable code for directing the incoming call signal to a vehicle information controller within the telematics unit.

11. The computer readable medium of claim 10, further comprising:
   computer readable code for connecting the incoming call signal to the vehicle information controller within the telematics unit.

12. The computer readable medium of claim 8, wherein the computer readable code for operating the telematics unit based on the second answer mode comprises:
   computer readable code for directing the incoming call signal to a user interface within the telematics unit.

13. The computer readable medium of claim 12, further comprising:
   computer readable code for connecting the incoming call signal to the user interface within the telematics unit responsive to a user interface activation.

14. The computer readable medium of claim 13, further comprising:
  computer readable code for determining the user interface is not activated; and
  computer readable code for activating an electronic voice-mail system.

15. A system for operating a telematics unit within a mobile vehicle, the system comprising:
  means for receiving an incoming call signal, the incoming call signal including an origin identifier;
  means for determining a first answer mode when the origin identifier is within a predetermined group of origin identifiers, and determining a second answer mode when the origin identifier is not within the predetermined group of origin identifiers wherein the predetermined group of origin identifiers is a call center identified group of origin identifiers, and wherein the incoming call signal is routed to a vehicle communication unit if the origin identifier is within the call center identified group of origin identifiers and wherein the incoming call signal is routed to a user interface if the origin identifier is not within the call center identified group of origin identifiers;
  means for determining an answer mode based on the origin identifier of the incoming call signal;
  means for initiating the answer mode responsive to the answer mode determination;
  and means for operating the telematics unit based on the initiated answer mode.

* * * * *